United States Patent
Sherba et al.

[15] 3,640,725
[45] Feb. 8, 1972

[54] SOYBEAN FRACTIONATION EMPLOYING A PROTEASE

[72] Inventors: Samuel E. Sherba, Willingboro, N.J.; Ronald B. Steigerwalt, Levittown; William T. Faith, Jr., Warminster, both of Pa.; Carl V. Smythe, Moorestown, N.J.

[73] Assignee: Rohm and Haas Company, Philadelphia, Pa.

[22] Filed: July 2, 1969

[21] Appl. No.: 838,534

[52] U.S. Cl. .................. 99/17, 99/98, 260/123.5
[51] Int. Cl. .......................... A23j 1/14, A23l 1/20
[58] Field of Search .................. 99/17, 14, 98; 260/123.5

[56] References Cited

UNITED STATES PATENTS

| | | | |
|---|---|---|---|
| 2,051,017 | 8/1936 | Schwarz et al. | 99/17 X |
| 3,476,739 | 11/1969 | Liggett | 99/17 X |
| 3,220,851 | 11/1965 | Rambaud | 99/98 |
| 3,157,513 | 11/1964 | Allen et al. | 99/17 |
| 2,217,264 | 10/1940 | Weizmann | 99/17 X |
| 2,473,255 | 6/1949 | Parfentjev | 99/14 X |

Primary Examiner—A. Louis Monacell
Assistant Examiner—William Andrew Simons
Attorney—George W. F. Simmons, Carl A. Castellan and Gerry J. Elman

[57] ABSTRACT

Process of separating nutritional components from soybeans or other oilseeds, employing enzymatic hydrolysis of protein. Clean, whole soybeans are comminuted, heated at about 90°–140° C., and then cooled by adding more water. A proteolytic enzyme, preferably derived from an Aspergillus or Bacillus sp., is added to the slurry, which is then maintained at an incubation temperature of 25°–75° C. until the protein is sufficiently hydrolyzed. The fibrous solids portion is then removed from the slurry, being useful as a livestock feed supplement. The oil phase may then be removed from the fluid portion of the slurry, as by separating an aqueous phase from an oil-containing phase in a cream separator. The aqueous phase is then acidified to about pH 4.5, to precipitate isoelectric protein, which may be recovered, e.g., by centrifugation. To obtain the main product of this process, soy protein hydrolysate, the remaining aqueous phase is desirably concentrated by conventional evaporation techniques, adjusted to substantially neutral pH, and then dried, e.g., by spray drying or lyophilization. Alternatively, the aqueous phase containing protein and/or protein hydrolysate may be employed as the basis of a nutritious beverage.

13 Claims, 1 Drawing Figure

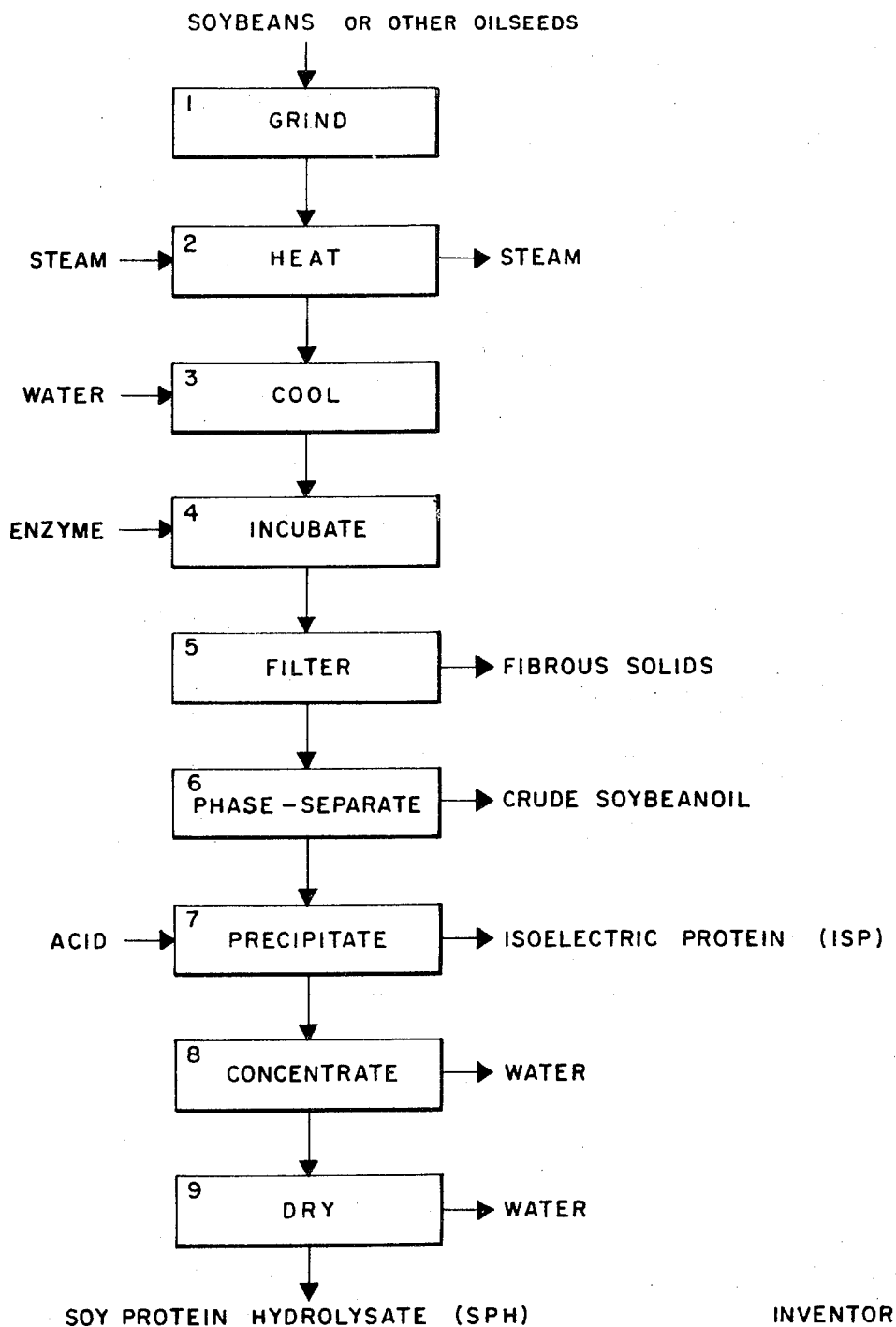

SOYBEAN FRACTIONATION EMPLOYING A PROTEASE

BACKGROUND OF THE INVENTION

1. Field of the Invention

This invention relates to an enzymatic method of fractionating soybeans or other oilseeds and to products prepared thereby.

2. Description of the Prior Art

Protein, and particularly nutritional quality protein, is in short supply in many areas of the world. Two distinct approaches are being taken to solve this problem.

First, there is a continual effort to find new sources of protein. Second, more efficient means are being sought for rendering the available protein utilizable. This invention embodies the latter approach.

Soybeans are excellent sources of protein. However, substantial difficulty is encountered in extracting the protein, oil and other components from them. Consequently, numerous processes have been devised for separating the various components of soybeans and soybean derivatives. However, in addition to being somewhat incomplete, they tend to be complicated and expensive.

For example, according to one process of the prior art, whole raw soybeans are soaked in water overnight so as to loosen the hulls. Following the soak the liquid is drained, and the soybeans are mechanically dehulled. The resulting dehulled soybeans are then flaked, and the oil is recovered either by pressing or by solvent extraction. After toasting of the flakes, they may be ground so as to constitute soy flour or soy grits. In the alternative, the flakes may be soaked in water to extract some of the available protein. Such an aqueous protein solution is commonly referred to as soy milk and may be utilized as a nutrient in that form. As another alternative, the pH of the soy milk may be adjusted to about 4.5 so as to precipitate the protein therefrom at its isoelectric pH. This isolated soy protein, or "isoelectric protein", (hereinafter ISP) may be isolated by filtering or like means.

Should it be desirable to solubilize the protein, additional processing would be needed. Generally, this would involve treating the isolated protein with alkali. However, this procedure is somewhat undesirable, especially when the resulting protein is to be utilized as a food or food supplement. Alkaline treatment often destroys certain essential amino acids which are present in the protein, detracting from their nutritional characteristics. Furthermore, such alkaline treatment is often uneconomical, and the protein resulting therefrom often has properties, such as objectionable taste, which would render it unsuitable for satisfactory utilization as a food material.

Alternative prior art processes have been proposed, in which ISP is subjected to the action of enzymes such as papain or the like to produce a hydrolyzed protein product.

It should also be noted that the soy milk prepared by aqueous extraction as described heretofore is not as nutritious as it might be. This is due to the fact that substantial amounts of the available protein fail to be extracted by soaking in water. Instead, this protein is often discarded as a waste material.

BRIEF DESCRIPTION OF THE DRAWING

The accompanying drawing is a block diagram of a preferred embodiment of the process of the present invention.

DESCRIPTION OF THE PREFERRED EMBODIMENTS

The present invention may be employed in the fractionation and the recovery of protein from any of the various oilseeds. The present process is particularly advantageous with such oilseeds as cottonseed, rapeseed, sunflower seed and sesame seed. At present, however, its most preferable application is in the treatment of soybeans.

Hereinafter, the process of the present invention is specifically described with respect to the conditions for processing soybeans, although it will be clear that modifications of times, temperatures and concentrations may be made by those skilled in the art to obtain optimum results when other oilseeds are used in the present process.

In accordance with the present invention, soybeans or other such oilseeds entering the process are to be cleaned and whole. Although in prior art processes for the separation of components of soybeans and other oilseeds having an integral hull, it is conventional to dehull the beans before treatment, no such dehulling is necessary in the present process. The comminution step is sufficient to prepare the beans for further processing in accordance with this invention, and thus the complex mechanical step of dehulling is advantageously eliminated. Of course, if desired, the beans could be dehulled and then subjected to the present process, in which event the solids obtained from step 5 (see below) would be of substantially different character.

Step 1:

The beans are comminuted, i.e., ground, chopped, sliced, flaked, etc., to maximize the effective surface area exposed. For example, if soybeans are subjected to grinding in this step, the particles are desirably within the range of 10 to 100 mesh.

Step 2:

The comminuted beans are heat treated at a temperature in the vicinity of boiling or above, advantageously from about 90° to 140° C., and preferably at about 120° C. with steam. For example, the treatment is continued for 1 or more minutes, with the time depending on the temperature and the amount of extractable protein desired. At a temperature of 120° C., the heating is desirably continued for about 5 to 15 minutes. At lower temperatures, the heating is desirably carried out longer; and at higher temperatures, the heating step may be shorter.

Several advantages arise from the inclusion of the heating step in the present process: the efficiency of protein extraction is improved; trypsin inhibitor present in such oilseeds as soybeans is inactivated; taste is improved; and the possibility of contamination is reduced. A possible explanation of the improvement in protein extraction efficiency, offered only as a hypothesis and not by way of limitation, would be that the heating step tends to break up the inherent tertiary structure of the protein, permitting the macromolecules to uncoil and thus to be exposed to the subsequent action of enzyme-containing solution. Furthermore, the heating is believed to disrupt the cells of the oilseeds, permitting the comminuted particles to release their contents more rapidly.

Step 3:

The heat-treated mass is cooled to incubation temperature, as by adding cooling water.

The total amount of water added during the heating and/or cooling steps is desirably between about two and 20 times the weight of the ground beans.

If desired, more water may be used, but no economical advantage would generally result. Preferably, the amount of water added is minimized to facilitate subsequent handling of the aqueous solutions and to permit the use of a minimum amount of enzyme to effect the desired enzyme concentration in step 4. Thus, it is preferred to employ no more than 10 parts, and preferably between about three and eight parts water per part soybean.

Indeed, the ability to obtain efficient extraction of protein at this high solids level constitutes a significant advantage for the present process.

In practice, about half of the total water may be contributed during the heating (step 2), and the balance during the cooling period (step 3), although, of course, these proportions may vary widely. Alternatively, dry beans may be heated and cooled, and the water may be added in a subsequent step.

Step 4: The proteolytic enzyme composition is then added to the slurry, which is maintained at incubation temperature and pH for a time sufficient to effect the desired degree of hydrolysis.

Although substantially any proteolytic composition could be employed in the process of the present invention, it is preferred to employ proteases of bacterial or fungal origin.

Advantageously, the bacterial proteases may be derived from a member of the genus Bacillus, such as *B. subtilis, B. mycoides, B. amyloliquifaciens, B. cereus, B. macerans, B. megaterium, B. sphaericus, B. circulans*, etc. A particularly preferable Bacillus for the preparation of protease useful in the present invention is B. *subtilis*.

Alternatively, a protease of fungal origin may be employed. This may be derived from a crude culture of Aspergillus, and desirably from the *A. flavus-orzyae* and *A. niger* groups.

Numerous strains and mutants of Bacillus and Aspergillus organisms useful for producing enzymes which may be employed in the process of the present invention are available from public culture collections, such as the American Type Culture Collection in Rockville, Maryland. Various methods of culturing micro-organisms and obtaining enzymes therefrom are well known in the art.

Food grade bacterial and fungal proteases suitable for use in the present process are widely available. Such compositions include Rhozyme P-53 Concentrate, and Protease 56 derived from bacteria, and Rhozyme P-11 Concentrate, and Rhozyme 41 Concentrate, derived from fungi, all of which are available from Rohm and Haas Company, Philadelphia.

The activity of the proteolytic enzymes useful in the process of the present invention may be determined in accordance with the test reported by L. A. Underkofler at J.A.O.A.C., 44 (2, 344 (1961). According to this test, an enzyme is defined as having an activity of 1,000 hemoglobin units (HU) per gram if 11.18 mg. of it produces an increase in soluble nitrogen of 5.00 mg. from 0.417 g. of hemoglobin in 5 hours at 40° C. and pH 4.7. This is equivalent to solubilizing approximately three times its weight of hemoglobin under these conditions.

Other methods for determining proteolytic activity include: the reduction in viscosity of an aqueous gelatin solution, measured in Gelatin Viscosity Units (GVU); and the reduction in viscosity of an aqueous glue solution, measured in Protease Glue (PGU).

Minor, or residual, enzymatic activities may also be determined. For example, pectinolytic activity may be determined on the basis of reduction in viscosity of apple pomace extract, measured in Apple Pomace Units (APU), or of citrus pectin, measured in Citrus Units (CU). Diastatic activity may be determined by the decrease in starch-iodine color of the reaction product, measured in Bacterial Amylase Units (BAU) in accordance with J. Amer. Dyestuff Rep. 56–7 (July 1962), or in Sandstedt, Kneen and Blish (SKB) units in accordance with Cereal Chem., 16 712 (1939). Lipolytic activity may be determined by the hydrolysis of olive oil, in accordance with the General Services Administration (GSA) Lipase Method B, Interim Federal Specification P-C-00440b (GSA-FSS) Feb. 20, 1963. Descriptions of these test methods are available from Rohm and Haas Co., Industrial Chemicals Dept., Philadelphia, Pa. 19105.

Preferably, the enzyme compositions employed in the present process have maximum activity at neutral or slightly acid or alkaline pH, since it is convenient to maintain the pH of the incubation mixture at its "ambient" value, generally about pH 6.5. However, the pH of the incubation broth may be within the range of about pH 5 to 9.5 and is preferably from about pH 5.5 to 8, wherein deleterious side reactions do not occur.

The incubation temperature, must, of course, be lower than that at which the enzyme is deactivated and yet sufficiently high for the hydrolysis to proceed at a reasonable rate, i.e., between about 25° and 75° C. Preferably, the incubation is performed between about 40° and 65° C. Within this latter range, the hydrolysis proceeds effectively, minimizing the possibility of microbial contamination.

The incubation broth may be sampled periodically to determine whether the desired degree of hydrolysis has been effected.

Complete hydrolysis is defined for the purpose of the present invention as the condition under which no appreciable ISP is produced in step 7, and no appreciable precipitate with cold trichloroacetic acid is obtained in the product of step 7. At a temperature of 50° C., for example, when 10 g. of a proteolytic enzyme composition (total activity: 7,500 PGU; 625,000 HU) is added to 1 kg. of ground soybeans in 11 kg. of slurry, incubation to a state of complete hydrolysis may be accomplished in 8 hours or less. The relative yield of ISP obtained may be increased by using less enzyme or an enzyme composition having a different activity, or by carrying out the incubation at a lower temperature and/or for a shorter duration. By varying these conditions, as well as pH, overall concentration, etc., the nature of the product mix may be altered, so as to obtain, for example, significant yields of ISP and/or significant yields of soluble protein which precipitates in cold trichloroacetic acid. Thus, the incubation conditions directly affect the amount and nature of the proteinaceous material in each of the protein-containing fractions.

Although it is general practice to employ an enzyme composition derived from a single organism to provide maximum proteolytic activity of the type desired, the present invention alternatively contemplates the use of enzyme mixtures. Such mixtures may comprise enzymes possessing proteolytic activity maxima at various pH's, which enzymes may be derived from bacterial, fungal, and other sources. Care should be used in mixing various enzymes, as, in some cases, each may tend to deactivate the other, probably caused by mutual digestion.

In addition, alternative enzyme compositions which contain a substantial degree of activity other than proteolytic may be advantageously employed as well.

For example, it is desirable to minimize the stachyose and raffinose content of soybean products to minimize flatulence caused by bacterial fermentation in the bowel. Thus, one may desirably employ in the enzyme mixture a carbohydrase, such as disclosed in U.S. Pat. application Ser. No. 725,497, filed Apr. 30, 1968 by Samuel E Sherba, and assigned to the assignee hereof, the disclosure of which is incorporated herein by reference. Such an enzyme composition is available as Diastase 80 from Rohm and Haas Co., Philadelphia. Alternatively, it is preferable to add a Carbohydrase, if at all, at a later stage of the process, as described hereinbelow.

The addition of lipase, either by itself or in admixture with carbohydrase, results in partial hydrolysis of the lipids to the component fatty acids. This action reduces the amount of readily separable oil fraction but adds an easily digestable fat component to the other product fractions.

The addition of an enzyme having cellulase activity may also be desirable for providing increased disruption of the cell walls and producing additional amounts of sugars in the final product.

Following incubation, the enzyme composition may optionally be deactivated by further heating. The time and temperature will depend on the nature of the enzyme composition, some being more temperature resistant than others. For a composition containing a readily deactivated protease, for example, deactivation may take place upon heating at about 75° C. for about an hour. This is entirely optional, however, inasmuch as the continued presence of active enzyme does not appreciably detract from further processing according to this invention.

Step 5:

Following incubation, the solids are separated from the slurry, e.g., by filtration through a screen having apertures appropriately selected relative to the size of the particles produced in step 1. If, for example, soybeans were ground to about 20-mesh particles in step 1, a 100-mesh screen might be employed to advantage in effecting the present separation. Optionally, filtration may be hastened by employing a basket centrifuge or other such conventional means.

If the process used for separating the solids is not sufficient to remove the finest particles, then further treatment such as centrifuging may be used if the presence of such fine solid particles is not desired in the final products.

The fibrous solids so separated may desirably be dried and utilized as an animal feed additive, containing crude fiber, protein and some oil.

Normally, the process would be carried out to produce a solid residue containing less than about 10 percent of the protein originally present in the soybeans, although fibrous solids having higher protein content may alternatively be recovered, e.g., for animal feed purposes, or for recirculating the solids fraction to another incubation step for further processing.

The fluid product of the present step may be used, with or without processing, as a full-fat soy milk. Alternatively, it may be processed further as follows.

Step 6:

The fluid portion obtained from the preceding step is readily separated into an oil phase and an aqueous phase. The phase separation may be accomplished merely by permitting the fluid portion to settle, but in practical use is desirably facilitated by employing such apparatus as a centrifuge, or preferably a cream separator common in the dairy industry. Alternatively, countercurrent solvent extraction or other means known to the industry for separating the oil fraction may be used.

The oil phase skimmed off substantially comprises crude soybean oil. The lecithin and other phospholipides, triglycerides and minor components of this phase may be fractionated by conventional techniques.

Optionally, the aqueous phase, comprising protein, hydrolyzed protein and carbohydrates, may be used as the basis for a nutritious beverage.

If an enzyme composition containing a lipase is employed in step 4, some fatty acids would also be present in this phase. Alternatively, a portion of the oil phase may be added to the aqueous phase to produce a beverage having the desired fat content. The solution may optionally be treated with a carbohydrase at this point to decrease the content of flatulence-producing sugars in the beverage. Desirably, the pH of the product is adjusted to about 6–7.5.

Alternatively, it may be desirable to separate the remaining protein from the hydrolysis products in the aqueous solution by performing the following steps.

Step 7:

The aqueous phase from the preceding step is acidified to about pH 4.5 with a food grade acid, e.g., lactic acid, to precipitate the isoelectric protein (ISP) remaining, which may then be separated by filtration, or preferably centrifugation. The moist solid product may be spray dried if desired.

Although ISP is one of the products of the present process, it is not, however, intended to be the major product. Rather, the proteolysis of step 4 is intended to produce a maximum soy protein hydrolysate (hereinafter SPH), which is not precipitated at the isoelectric point. According to prior art processes for the preparation of SPH, the protein is first isolated from the soybeans by the conventional techniques described hereinabove and is then hydrolyzed as a separate step. In the present process, on the other hand, the ISP is recovered as a solid during this step, and the SPH previously formed by enzymatic action, remains in solution.

Step 8:

If it is desired to recover the SPH as a dry product or concentrated solution, the centrifugate from the preceding step is optionally adjusted to a pH of about 6–7.5 and then desirably is concentrated by conventional evaporation techniques, such as flash evaporation, triple-stage evaporation, reverse osmosis separation, etc. Optionally, the pH adjustment, if performed, may be carried out in step 9.

Step 9:

The solution of SPH, preferably from step 8, but optionally from step 7 omitting step 8, may then be subjected to spray drying, or alternatively to lyophilization, air-toss drying, heat drying etc., to recover the SPH in solid form, along with carbohydrates and other soluble materials.

EXAMPLES

The following examples of laboratory preparations are presented to illustrate more fully some alternative methods for carrying out the process of the present invention.

The various enzyme compositions employed in the following examples are indicated in table I.

TABLE I.—ENZYME COMPOSITIONS

| Composition | Major enzymatic activity | Measured proteolytic activity | | Measured other activity |
|---|---|---|---|---|
| B—Derived from *B. subtilis*. | Neutral bacterial protease, as described by McConn et al., J. Biol. Chem., 239 3706 (1964). | 62,500 H U; 510,000 G V U (pH 7.0). | 750 P G U; 298,000 G V U (pH 4.7). | Pectinolytic: 0 A P U; below 30 C U. Diastatic: 2900 B A U. |
| P—Derived from *A. oryzae*. | Neutral and alkaline *A. oryzae* proteases. Little of the acid protease. See Bergkvist, Acta. Chem. Scand., 17 1521 (1963). Produces extensive hydrolysis, but as measured by amino nitrogen liberated, hydrolysis to individual amino acids is far from complete. | 194,000 H U | 671 P G U; 309,000 G V U (pH 4.7). | Pectinolytic: 110 A P U; 140 C U. Diastatic: 460 B A U; 613 SKB Lipolytic: 4.2 GSA (pH. 6.0). |
| H—Derived from *A. oryzae*. | High amount of the acid *A. oryzae* protease as well as neutral and alkaline protease. See Bergkvist, supra. | 305,000 H U; 275,000 G V U (pH 7.0). | 457 P G U; 167,000 G V U (pH 4.7). | Pectinolytic: 0 A P U; 123 C U. Diastatic: 155 B A U; 183 SKB. |
| C—Derived from *A. niger*. | Carbohydrase. Hydrolyzes saccharide containing α 1,6 and/or α 1,2 linkage. See U.S. Patent Appln. Serial No. 725,497, filed April 30, 1968. | | Below 5 P G U. | 530 Carbohydrase units. |

EXAMPLE 1

Ten g. of Kanrich No. 1 soybeans containing 38.0 percent protein, 16.73 percent oil and 6.4 percent moisture was ground to 20-mesh particles and then added to 50 ml. water, heated in an autoclave at 121° C. for 5 minutes, and then cooled. An additional 50 ml. water was then added, along with an enzyme composition, containing proteolytic and carbohydrase activity. The slurry was incubated at 50° C. at "ambient" pH 6.3 for 8 hours and then filtered through a 100-mesh screen. The fibrous residue (1) on the screen was washed with water until the solution collected amounted to 100 ml. then the residue (1) was dried in an oven at 50° C.

The solution was then centrifuged at 10,000 r.p.m. for 1 min., and the centrifugate was decanted. The residue was washed with 10 ml. water and recentrifuged. The washed residue (2) was dried in a dessicator.

The decanted centrifugate contained oil, which was removed by gravity filtering through Whatman No. 1 paper. After drying, the paper was exhaustively extracted with petroleum ether. The protein remaining on the paper (3) was determined. The petroleum ether was then evaporated off, leaving oil to be determined by weight. It was found that 38 percent of the oil was extracted using a mixture of enzyme compositions B and C; 50.3 percent was extracted using corresponding weight amounts of compositions P and C.

The filtrate (4) was then acidified (pH 4.5) to precipitate any ISP remaining, but none was obtained. The filtrate was then combined with an equal volume of 10 percent trichloroacetic acid at 4° C., and no visible precipitate resulted.

was added to 100 ml. water. The mixture was heated to 121° C. in an autoclave for 15 min. and then cooled to 40° C. An

TABLE II.—TOTAL SOLIDS AND PROTEIN CONTENT OF VARIOUS FRACTIONS

| Enzyme composition (See Table I) | B (100 mg.) plus C (15 mg.) | | P (100 mg.) plus C (15 mg.) | |
|---|---|---|---|---|
| | Weight | Protein Content | Weight | Protein content |
| Fibrous residue on screen (1), g | 2.40 | 0.500 | 2.60 | 0.536 |
| Centrifugate (2), g | 1.50 | 0.563 | 0.922 | 0.236 |
| Filter paper residue (3), g | 0.082 | 0.082 | 0.075 | 0.075 |
| Filtrate [solids] (4), g | 4.93 | 2.400 | 5.27 | 2.590 |
| Total, g | 8.91 | 3.545 | 8.87 | 3.437 |

The amount of protein in the various fractions was determined by Kjeldahl analysis for nitrogen, using a conversion factor of 6.25, as reported in table II.

EXAMPLE 2

Ten g. of the soybeans of example 1 was ground to 20-mesh particles and then added to 100 ml. water, heated in an autoclave at 121° C. for 15 minutes, and then cooled. A mixture of enzymes B and P was added, and the slurry was incubated at 40° C. at pH 6.5 for 2 hours and then filtered through a 100-mesh screen. The residue on the screen was washed with water until 100 ml. of filtrate (a) was collected.

The filtrate was then centrifuged, and the centrifugate was filtered through Whatman No. 1 paper to remove the oil phase. The filtrate was then acidified to pH 4.5, and a precipitate (b) was produced.

TABLE III.—PERCENT PROTEIN EXTRACTED AND ISP PRODUCED

| Enzyme composition (See Table I) | B (100 mg.) plus P (100 mg.) | Control (no enzyme) |
|---|---|---|
| Protein content of filtrate (a), g | 3.30 | 3.02 |
| Fraction of protein extracted from beans into filtrate (a), percent | 86.9 | 79.5 |
| Precipitate at pH 4.5 (b), g | 1.79 | 5.46 |
| Protein content of precipitate (b) [ISP], g. | 0.836 | 2.72 |

The amount of protein in the various fractions was determined as in example 1, as reported in table III. It is seen that, although 0.28 g. more protein was extracted from the beans when the enzyme mixture was used, only 0.836 g. of ISP was produced, as compared with 2.72 g. ISP using no enzyme. Thus it is to be inferred that a substantially greater amount of the extracted protein was solubilized to SPH when the enzyme composition was employed.

enzyme composition having an activity of 216 PGU was added to the mixture, which was then incubated at 40° C. and pH 6.4 for 2 hr. under agitation in a 275-r.p.m. gyrorotary flask.

After incubation, the mixture was filtered through a 100-mesh screen, thereby removing the solid residue. In this case, the solids did not contain much, if any, fibrous hull material, as flour from dehulled beans had been used. By washing the residue with water, the volume of filtrate was brought up to 100 ml. The filtrate was then centrifuged at 8,000 r.p.m. to remove fine particles.

The total protein content of the centrifugate (a) was determined by analyzing for nitrogen by the Kjeldahl method. The conversion factor used to calculate amount of protein was 6.25. The second line of table IV reports these values as percentages of the protein originally present in the soy flour, i.e., 4.41 g.

The centrifugate was then acidified to about pH 4.5, and the isoelectric protein was removed by filtration. The remaining proteinaceous material, i.e., SPH, determined by the Kjeldahl method is reported in the third line of table IV. The last line of table IV presents the percentage of total extracted protein represented by the hydrolysate.

From the data of table IV, it is evident that a greater portion of the protein originally present is extracted using the present enzymatic process, and that most (84–95 percent) of the protein extracted using enzyme is in the form of SPH whereas only 11 percent of the protein extracted under the same conditions but without enzyme is SPH. It is further to be noted that varying results were obtained even though the proteolytic activity of each composition was 216 PGU. It is to be concluded that one may vary the relative amounts of SPH recovered, compared with ISP, by varying the nature of the enzyme composition employed, even though the measured activity used is kept constant.

TABLE IV.—EXTRACTION AND HYDROLYSIS OF PROTEIN FROM SOY FLOUR BY ENZYME COMPOSITIONS HAVING EQUIVALENT PROTEOLYTIC ACTIVITY VALUES

| Enzyme composition (See Table I) | B (288 mg.) | P (328 mg.) | H (473 mg.) | Control (no) enzyme |
|---|---|---|---|---|
| Protein content of centrifugate (a), g | 3.66 | 3.38 | 3.74 | 2.85 |
| Fraction of protein extracted from soy flour into the centrifugate (a), percent. | 83.0 | 77.0 | 85.0 | 64. |
| Soy protein hydrolysate (SPH), g | 3.08 | 3.22 | 3.57 | 0.312 |
| Fraction of extracted protein obtained as SPH, percent | 84.2 | 95.0 | 95.4 | 11.0 |

EXAMPLE 3

In this example, Molino Soy Flour, obtained from El Molino Mills, Alhambra, Calif. was employed. This product is a slightly toasted, full-fat soy flour of approximately 40-mesh 275particles derived from dehulled Hill or Lee soybeans. Ten g. of the soy flour, having a protein content of 44.1 percent

EXAMPLE 4

Ten g. of Kanrich No. 1 soybeans were ground to 20 mesh, added to 100 ml. water and maintained at the pretreatment temperature for 20 minutes, cooled and then incubated under 275r.p.m. gyrorotary agitation for 2 hours at 40° C. The slurry was then filtered through a 100-mesh screen, and the residue was washed with water until 100 ml. of fluid (a) was obtained. The fluid was acidified with lactic acid to pH 4.5, and ISP was recovered by centrifugation. The centrifugate, containing SPH, and the fluid (a) were analyzed for protein nitrogen by the Kjeldahl method. The results, expressed as fraction of protein extracted and fraction of extracted protein as SPH, are given in table V.

TABLE V.—EFFECT OF PREHEATING ON ENZYMATIC EXTRACTION FROM SOYBEANS

| | Pretreatment temperature | | | | | | | |
|---|---|---|---|---|---|---|---|---|
| | Room temperature | | 50° C. | | 90° C. | | 121° C. | |
| | B (100 mg.) | Control (none) | B (100 mg.) | Control (none) | B (100 mg.) | Control (none) | B (100 mg.) | Control (none) |
| Enzyme composition (See Table I) | | | | | | | | |
| Fraction of protein extracted from beans into fluid (a), percent | 62.7 | 60.5 | 62.7 | 59.0 | 66.6 | 58.0 | 75.0 | 68.2 |
| Fraction of extracted protein as SPH, percent | 28.2 | 10.5 | 26.2 | 10.5 | 49.5 | 6.6 | 63.2 | 17.4 |

EXAMPLE 5

Ten g. of glandless cottonseed containing 37.8 percent protein was ground to 10-mesh particles. Fifty ml. water was added to the ground cottonseed, and the slurry was maintained at the pretreatment temperature for 10 min. Fifty ml. water and the enzyme composition was then added to the slurry, which was incubated for 2 hours at 40° C. in a gyrorotary flask at 275 r.p.m. The slurry was then filtered through a 100-mesh screen, and the residue was washed with water until the filtrate amounted to 100 ml. The filtrate (a) was analyzed for nitrogen by the Kjeldahl method.

The filtrate (a) was then subjected to centrifugation at 10,000 r.p.m. for 1 min., and the centrifugate (b) was analyzed for nitrogen. The results, in terms of protein content, are shown in table VI.

a temperature between about 25° and 75° C. and a pH between about 5 and 9.5.

4. The process of claim 1, wherein said enzyme composition comprises a proteolytic enzyme derived from a fungus, bacterium, or mixture thereof.

5. The process of claim 4, wherein said fungus is an Aspergillus and said bacterium is a Bacillus.

6. The process of claim 4, wherein said enzyme composition further comprises a carbohydrase, lipase or cellulase.

7. The process of claim 1, wherein said fluid product comprises an oil phase consisting essentially of crude oilseed oil and further comprises the rest of said fluid product consisting essentially of a protein-containing, predominately aqueous, fluid mixture;

further comprising the step of:
separating at least a portion of the oil phase from the rest of said fluid product to recover crude oilseed oil and a protein-containing, predominately aqueous fluid mixture.

8. The process of claim 1, wherein the oilseeds are soybeans.

9. The process of claim 8, wherein said comminuted oil-

TABLE VI.—EXTRACTION OF PROTEIN FROM COTTONSEED

| | Pretreatment temperature | | | | | |
|---|---|---|---|---|---|---|
| | Room temperature | | | 121° C. | | |
| | B (100 mg.) | P (100 mg.) | Control (none) | B (100 mg.) | P (100 mg.) | Control (none) |
| Enzyme composition (See Table I) | | | | | | |
| Protein content of filtrate (a), g | 2.26 | 2.25 | 2.13 | 2.90 | 2.63 | 1.12 |
| Fraction of protein extracted from cotton seed into filtrate (a), percent | 59.7 | 59.5 | 56.4 | 76.6 | 69.6 | 29.5 |
| Protein content of centrifugate (b), g | 1.31 | 1.31 | 0.976 | 2.43 | 1.98 | 0.863 |
| Fraction of filtrate (a) protein in centrifugate (b), percent | 34.7 | 34.7 | 25.8 | 64.3 | 52.4 | 22.8 |

From table VI, it is clear that more efficient separation of protein, in soluble form, from cottonseed is obtained by the method of the present invention.

Variations may of course be made without departing from the scope and spirit of the invention.

What is claimed is:
1. A process for fractionating oilseeds, which comprises the successive steps of:
heating comminuted whole oilseeds having their hulls at a temperature at least about the boiling point of water in order to improve the efficiency of protein extraction and to inactivate trypsin inhibitor present in such oilseeds;
incubating a slurry of said comminuted oilseeds and an enzyme composition having proteolytic enzyme activity at a temperature and pH at which proteolysis is effected but at which said enzyme activity is not deactivated; and
separating the solid residue from the fluid portion of said incubation mixture, the fluid product containing a substantial fraction of the protein content of the oilseeds.

2. The process of claim 1, wherein said comminuted oilseeds are heated at a temperature between about 90° and 140° C.

3. The process of claim 1, wherein said incubation slurry has seeds comprise soybeans ground to particles between about 10 and 100 mesh.

10. The process of claim 8, wherein said fluid product comprises an oil phase consisting essentially of crude oilseed oil and further comprises the rest of said fluid product consisting essentially of a protein-containing, predominately aqueous fluid mixture;

further comprising the steps of:
separating at least a portion of the oil phase from the rest of said fluid product to recover crude soybean oil and a protein-containing, predominately aqueous fluid mixture.

11. The process of claim 10, wherein the oil phase is separated from the aqueous phase of said fluid product to recover crude soybean oil and a protein-containing aqueous phase.

12. The process of claim 11, further comprising the steps of:
adjusting the pH of said aqueous phase to the isoelectric point of the protein therein; and
separating the isoelectric precipitate from the remaining solution.

13. The process of claim 12, further comprising the step of:
drying the remaining solution to recover soy protein hydrolysate.